(12) United States Patent
Palm et al.

(10) Patent No.: US 12,485,482 B2
(45) Date of Patent: Dec. 2, 2025

(54) METHOD OF RECYCLING A STRUCTURE OR AT LEAST A PORTION THEREOF, AND COMPONENT FOR AN AIRCRAFT OR SPACECRAFT

(71) Applicant: Airbus SAS, Blagnac (FR)

(72) Inventors: Frank Palm, Unterhaching (DE); David Schimbäck, Ottobrunn (AT)

(73) Assignee: Airbus SAS, Blagnac (FR)

( * ) Notice: Subject to any disclaimer, the term of this patent is extended or adjusted under 35 U.S.C. 154(b) by 326 days.

(21) Appl. No.: 18/188,714

(22) Filed: Mar. 23, 2023

(65) Prior Publication Data

US 2023/0311206 A1 Oct. 5, 2023

(30) Foreign Application Priority Data

Mar. 31, 2022 (EP) ..................................... 22165984

(51) Int. Cl.
| | |
|---|---|
| *B22F 8/00* | (2006.01) |
| *B22F 1/14* | (2022.01) |
| *B22F 9/00* | (2006.01) |
| *B22F 9/04* | (2006.01) |
| *B22F 10/28* | (2021.01) |

(52) U.S. Cl.
CPC .................. *B22F 8/00* (2013.01); *B22F 1/14* (2022.01); *B22F 9/04* (2013.01); *B22F 10/28* (2021.01); *B22F 2009/001* (2013.01); *B22F 2301/052* (2013.01)

(58) Field of Classification Search
CPC .... B22F 8/00; B22F 10/28; B22F 1/14; B22F 9/04; B22F 2009/001; B22F 2301/052
See application file for complete search history.

(56) References Cited

U.S. PATENT DOCUMENTS

| | | | |
|---|---|---|---|
| 8,202,347 B2 | 6/2012 | Verdier et al. | |
| 2020/0086390 A1* | 3/2020 | LaTour | B22F 10/28 |
| 2020/0189000 A1 | 6/2020 | Latour et al. | |
| 2021/0002744 A1 | 1/2021 | Martin et al. | |
| 2021/0146439 A1* | 5/2021 | Hundley | B22F 10/28 |

FOREIGN PATENT DOCUMENTS

| | | |
|---|---|---|
| EP | 3725439 A2 | 10/2020 |
| WO | 2018144323 A1 | 8/2018 |

OTHER PUBLICATIONS

Schade et al. ("Atomization" ASM Handbook, vol. 7, Powder Metallurgy. 2015) (Year: 2015).*

(Continued)

*Primary Examiner* — Ricardo D Morales
(74) *Attorney, Agent, or Firm* — Greer, Burns & Crain, Ltd.

(57) ABSTRACT

A method of recycling a structure or at least a portion thereof, and component for an aircraft or spacecraft. The structure comprises components connected to each other and each made from a metal alloy. The method includes producing, at least from a plurality of the components, including components made from at least two different metal alloys, a powder adapted to being used as a starting material in an additive manufacturing process. Also, a component for an aircraft or spacecraft, made using additive manufacturing, the component being produced a powder obtained in accordance with the method.

19 Claims, 6 Drawing Sheets

(56) References Cited

OTHER PUBLICATIONS

European Search Report for European Patent Application No. 22165984.0 dated Dec. 6, 2022; priority document.
P. Moghimian et al., "Metal Powders in Additive Manufacturing: A Review on Reusability and Recyclability of Common Titanium, Nickel and Aluminum Alloys" Additive Manufacturing, vol. Journal Pre-Proof, May 1, 2021.
Mair, P., et al., "Laser powder bed fusion of nano-CaB6 decorated 2024 aluminum alloy", Journal of Alloys and Compounds 863 (2021) 158714.
Tan, Q., et al., "Inoculation treatment of an additively manufactured 2024 aluminium alloy with titanium nanoparticles", Acta Materialia 196 (2020) 1-16.
Stemper, L., et al., "On the potential of aluminum crossover alloys", Progress in Materials Science 124 (2022) 100873.

\* cited by examiner

METHOD OF RECYCLING A STRUCTURE OR AT LEAST A PORTION THEREOF, AND COMPONENT FOR AN AIRCRAFT OR SPACECRAFT

CROSS-REFERENCES TO RELATED APPLICATIONS

This application claims the benefit of European Patent Application Number 22165984.0 filed on Mar. 31, 2022, the entire disclosure of which is incorporated herein by way of reference.

FIELD OF THE INVENTION

The invention relates to a method of recycling a structure, in particular an aircraft or spacecraft structure, or at least a portion thereof. Furthermore, the invention relates to a component for an aircraft or spacecraft, in particular a component conceived for being used as a part of an aircraft or spacecraft structure.

BACKGROUND OF THE INVENTION

Although the invention may be useful in combination with complex and in particular lightweight structures in many fields of technology, the invention and the underlying problem will be explained in the following in greater detail and exemplary manner with regard to a structure of an aircraft or space vehicle, but without limiting the invention to that effect.

Aluminum alloys have been widely used for decades in the construction of aircraft structures for instance, and still are in widespread use in this field today.

Such an aircraft structure may, for example, comprise a large number of individual parts and elements made from aluminum alloys. However, these parts and elements have to comply with different requirements, e.g. regarding mechanical load-bearing capacity, manufacturing, or other aspects. Accordingly, nowadays, many aluminum aircraft structures comprise components each made from one out of a number of different metal materials, especially different aluminum alloys. For instance, various combinations of parts manufactured from aluminum alloys selected from the 2xxx (AlCuMg), 5xxx (AlMg), 6xxx (AlMgSi) and 7xxx (AlZn) alloy series, in other words a "mixture" of metal parts and elements made from different alloys, may be present. Generally, a considerable portion of the aircraft structure, if not the predominant portion thereof, may be made from aluminum alloys, and a plurality of different alloys may often be present.

The production of aluminum and its alloys involves considerable effort and use of energy. Considering aspects of sustainability, reduction of consumption of resources, reduction of environmental impact, and also cost, it would be desirable to be able to efficiently recycle aircraft structures of the kind described above at the end of the useful lifespan thereof. In particular, considering that such end-of-life aircraft structures comprise many components of high-grade aluminum materials, it would be desirable to be able to recycle such aircraft structures in a manner making it possible to produce new structures and components for demanding or structural applications, e.g. for use in new aircraft or spacecraft structures. Accordingly, it would be desirable to avoid unnecessary "down-cycling" of the aluminum alloys present in the end-of-life structure.

The different aluminum materials present in aircraft structures may, in principle, be separated from each other and sorted in order to obtain essentially homogeneous fractions of material, to be recycled separately.

Yet, within the aircraft structure, components from different alloys usually are permanently connected to each other, for instance by riveting, welding or adhesive bonding, or sometimes by bolting. Therefore, cleanly separating components of different alloys from each other is a complex, laborious, time-consuming and costly process. Further, care must be taken to avoid contamination of the individual material fractions as far as possible.

Nowadays, complex three-dimensional workpieces can be produced in a flexible manner from metal materials using metallic additive manufacturing. A number of additive manufacturing processes, or "3D printing" methods, have been described. One example which makes it possible to produce three-dimensional objects from a metal powder is laser powder bed fusion.

The production of a metal powder for use in additive manufacturing is, for instance, described in EP 3 725 439 A2, which describes producing such a powder via atomization of an aluminum alloy melt. EP 3 725 439 A2 proposes to produce the powder from aluminum or an existing aluminum alloy and a further metal.

Mair, P., et al., "Laser powder bed fusion of nano-$CaB_6$ decorated 2024 aluminum alloy", Journal of Alloys and Compounds 863 (2021) 158714, discuss improvements of the processability of 2024 aluminum alloy in additive manufacturing via laser powder bed fusion, obtained by decorating 2024 alloy powder with calcium hexaboride ($CaB_6$) nanoparticles.

Tan, Q., et al., "Inoculation treatment of an additively manufactured 2024 aluminium alloy with titanium nanoparticles", Acta Materialia 196 (2020) 1-16, is concerned with increasing the processability of the 2024 aluminum alloy by selective laser melting, elimination of hot-tearing cracks and grain refinement, using Ti nanoparticles as an inoculant.

A summary on so-called "cross-over" aluminum alloys is provided by Stemper, L., et al., "On the potential of aluminum crossover alloys", Progress in Materials Science 124 (2022) 100873, focusing more specifically on 5xxx/2xxx or 5xxx/7xxx "cross-over" alloys.

Stemper, L., et al., "Giant hardening response in AlMgZn (Cu) alloys", Acta Materialia 206 (2021) 116617 deals with thermomechanical treatment of the AlMg alloy EN AW-5182 modified with additions of Zn or of Zn and Cu, in particular with a view to a long-standing trade-off between strength and formability.

SUMMARY OF THE INVENTION

Against this background, the problem to be solved by the invention is to provide an improved, efficient, cost-effective way of recycling a complex structure, in particular an aircraft or spacecraft structure, which in particular avoids or reduces laborious and costly dismantling and sorting operations, and further in particular to avoid or reduce significant "down-cycling" of material.

According to the invention, this problem is solved by a method having the features of one or more embodiments herein and/or by a component having the features of one or more embodiments herein.

Accordingly, the invention provides a method of recycling a structure, in particular an aircraft or spacecraft structure, or at least a portion thereof, wherein the structure comprises components connected to each other and each made from a metal alloy, in particular a light metal alloy, more particularly an aluminum alloy. The method includes producing, at least from material of a plurality of the components including components made from at least two different metal alloys, in particular light metal alloys, more particularly aluminum alloys, a powder adapted to being used as a starting material in an additive manufacturing process.

Furthermore, the invention provides a component for an aircraft or spacecraft, in particular for use as a part of an aircraft or spacecraft structure, made using additive manufacturing, wherein the component is producible using a powder obtained in accordance with such a method as a starting material in the additive manufacturing.

An idea underlying the invention is to directly convert mixed metal materials, in particular mixed aluminum alloys, available in the form of components, e.g. of an Al alloy based aircraft or spacecraft structure to be recycled, into a valuable powder which can then be used afterwards in a further step for additive manufacturing, or 3D printing, of new high-quality components. The invention enables cost-effective and energy-effective recycling of complex structures, such as aircraft or spacecraft structures, into new high quality products. Accordingly, metal materials within the end-of-life structure are efficiently re-used without expensive dismantling, separation and composition-respecting sorting, and down-cycling can be avoided or at least significantly reduced. In particular, the powder can be produced without separating components originally connected in the structure that is to be recycled, or at least with reduced effort for material separation.

Additive manufacturing can be used to flexibly and efficiently produce new components for aircraft or spacecraft, even if the demand for recycling or re-utilization of end-of-life structures in the aerospace industry significantly fluctuates. New components may be made from the powder provided in accordance with the invention in line with demand, and further in a flexible manner in accordance with the specific materials available for being recycled at a given instant.

Also, in additive manufacturing components from metal materials, high local cooling rates, e.g. in terms of the thermal gradient measured in K/s, can be implemented well or may be inherent as well as metallurgically helpful to the manufacturing process. This makes it possible—in particular in case of mixtures of different alloys or "cross-over" aluminum alloys—to retain the alloying elements in solid solution, preventing undesired premature creation, also called precipitation, of larger brittle phases driven by a high amount of alloying elements in the "cross-over" alloy melt upon solidification, and in particular to obtain desired and controlled precipitation by a targeted subsequent heat treatment process in a further step afterwards.

The invention thus makes efficient use of the potential of additive manufacturing to process material combinations, in the form of a powder, which cannot be processed in conventional manner, or which are difficult to process by conventional routes. In particular, unsorted aerospace aluminum alloy components can be efficiently recycled to produce valuable new components.

Advantageous improvements and developments of the invention are contained in the dependent claims as well as in the description referring to the drawings.

According to a development, producing the powder includes melting the material of the plurality of components and atomizing the melt. This makes it possible, for instance, to obtain an essentially homogeneous powder. Further, advantageously, by atomizing the melt, the particles of the powder may already have a rounded shape, in particular substantially spherical shape. Such a powder may already exhibit good flowability, and a further treatment modifying the shape of the particles, e.g. plasma treatment, may not be necessary in this case. Also, using melting and atomization of the melt, it may be possible to facilitate the production of powders from components including metal materials that are very ductile even at low temperature.

Preferably, forming the melt comprises subjecting at least some of the plurality of the components or sections thereof which are still connected to each other to melting, and/or comprises mechanically reducing at least some of the plurality of the components or sections thereof which are still connected to each other to smaller pieces and subjecting the smaller pieces to melting. There is hence no need to separate the components initially joined in the structure, which significantly reduces time, effort and cost for the recycling thereof.

In particular, for melting the material of the plurality of components, each component may be provided as a whole or a section of the component may be provided. The components and/or component section(s) may or may not be further reduced to pieces before undergoing melting.

In particular, the melt may be subjected to gas atomization, e.g. inert gas atomization, or to centrifugal atomization. Accordingly, the melt can be efficiently atomized to form droplets, which after cooling form a powder.

Preferably, the melt is essentially homogeneous, resulting in an essentially homogeneous powder after atomization. Depending on the cooling rate during atomization and formation of the powder particles, in some implementations some phase separation may occur within the particle. When the particles are again subjected to melting during the additive manufacturing, again a homogeneous melt can form which can undergo cooling at a high cooling rate, avoiding precipitation at this stage.

In a development, producing the powder includes mechanically reducing the material of the plurality of components to powder, in particular by cutting and/or chopping and/or shredding and/or chipping and/or grinding. This provides an alternative and useful way of form powder particles.

Further, preferably, mechanically reducing the material to powder comprises subjecting at least some of the plurality of the components or sections thereof which are still connected to each other to the mechanical reduction to powder, e.g. by cutting and/or chopping and/or shredding and/or chipping and/or grinding the connected components or sections. Thus, it is not necessary to separate the components or sections thereof initially joined in the structure, which significantly reduces time, effort and cost for the recycling thereof.

In particular, the mechanical reduction to powder may be performed at low temperature, e.g. by or including grinding at low temperature. This can facilitate mechanically reducing components of metal materials to powder that have considerable ductility at normal temperature but become sufficiently brittle at lower temperatures, e.g. to be efficiently ground.

Further, preferably, the plurality of components or sections thereof may be mechanically reduced to powder comprising particles, flakes and/or chips having a size smaller than 100 µm.

In an improvement, producing the powder further includes subjecting the powder to a plasma treatment, in particular to a plasma spheroidization treatment. This can be useful in particular if the material of the plurality of components has been reduced to powder in a mechanical manner. Using plasma, irregular fragments of the material, obtained e.g. from chopping, cutting, shredding, chipping and/or grinding, which initially may not exhibit sufficient flowability for being used in additive manufacturing, may be modified to become rounded or spheroid. Thereby, the flowability of the powder can be significantly improved by plasma spheroidizing the flakes, chips and/or fragments, so as to obtain a powder suitable for being processed in additive manufacturing.

Furthermore, subjecting the powder to the plasma treatment may be used to remove organic contaminations, e.g. from sealants or similar In some cases, for example, plasma treatment of the powder may further be useful for deoxidation of the powder.

According to an improvement, producing the powder comprises nano-decorating the powder with at least one additive, in particular an additive capable of acting as a grain refiner. The nano-decorating step makes it possible to adjust the chemistry of the alloy that will be obtained during the 3D metal printing and also to obtain a fine grain solidification microstructure. In this way, it becomes possible to manipulate and improve the processability of the powder in additive manufacturing or 3D metal printing, for example by avoiding solidification hot cracking. Accordingly, the powder obtained can be adapted to be successfully processed in a defined powder based additive manufacturing process.

In particular, a combination of plasma spheroidizing and thereafter nano-decorating the powder may be provided, which helps to efficiently produce a tailor-made powder without a need to fully remelt the material(s), in a cost and energy effective manner.

The powder may be nano-decorated with one or more than one additive.

In a preferred development, the additive(s) for nano-decoration may be selected from or may comprise at least one of titanium (Ti), silicon (Si), a zirconium hydride, for example $ZrH_2$, a titanium diboride ($TiB_2$), a calcium hexaboride ($CaB_6$), a lanthanum hexaboride ($LaB_6$). In further or alternative developments, it is conceivable to use other additive(s) such as one or more higher-melting pure metal(s) or alloy(s).

The additive(s) may, in particular, be provided in the form of nano-sized powder(s).

For example, in a development, the step of nano-decorating the powder with the additive(s) may be implemented by mixing the powder and the additive and/or by mechanical alloying e.g. in a ball mill or using an ultrasonic device or via other deposition methods.

In a preferred development, the powder produced is adapted for being used as a starting material in a powder bed process, in particular in a laser powder bed fusion process, or in a heat-assisted spraying process, as the additive manufacturing process. In heat-assisted spraying, which is often called thermal spraying, a gas-supported powder spraying process is overlaid by a heat source like a laser beam, plasma beam, electrical arc or similar, which effects melting of the powder, applied layer-wise.

In particular, the additive manufacturing process comprises locally melting the powder and further enables the melt resulting therefrom to cool at a cooling rate of at least 10,000 Kelvin per second ($10^4$ K/s). In some embodiments, the cooling rate may be higher than 100,000 Kelvin per second ($10^5$ K/s), and may reach 1,000,000 Kelvin per second ($10^6$ K/s). At high cooling rates, the alloying elements homogeneously distributed in the melt can be maintained in solid solution after solidification, avoiding undesired phase separation. In particular, a targeted heat treatment of a new component made using additive manufacturing from the powder may in a later step be performed in order to obtain or promote precipitation as desired.

For example, the plurality of components, at least from which the powder is produced, may include components each made from an aluminum alloy, in particular an aerospace aluminum alloy, for instance an aluminum alloy classified in one of the 2xxx, 5xxx, 6xxx and 7xxx aluminum alloy series. Such components may comply with different requirements in the original structure, e.g. aircraft or spacecraft structure.

When reference is made herein to the numerical codes of aluminum alloys or aluminum alloy series, these are based on the nomenclature for wrought alloys of the Aluminum Association (AA), as also reflected in the EN 573-3 standard. The 2xxx series hence designates the AlCuMg alloy system, the 5xxx series the AlMg alloy system, the 6xxx the AlMgSi alloy system and the 7xxx series the AlZn alloy system.

In a development, the plurality of components may include components made from alloys classified in at least two different alloy series, in particular in at least two different aluminum alloy series, more preferably in at least two different aluminum alloy series out of the 2xxx, 5xxx, 6xxx and 7xxx series. In accordance with this development, a new component formed with a cross-over alloy or "secondary alloy" can be additively made from the powder produced.

In accordance with further developments, the plurality of components comprises one or more of at least a portion of an outer fuselage skin, a wing cover, a fuselage stringer, a wing stringer, a fuselage frame, an internal structural element of a fuselage, a bracket or a fastening element or any other metallic structural component installed in an aircraft or spacecraft structure.

In particular, the plurality of components comprises components connected to each other using rivets or using a bolted connection or welded to each other or adhesively bonded to each other. Using the method proposed in accordance with the invention, components joined or assembled in particular in any of these ways can be recycled efficiently and cost-effectively, and new components can be produced in an improved, more sustainable manner. With the method of the present invention, it can be avoided to loosen and separate any of these joints, possibly after many years of service of the structure, which would be a complex and costly task.

In accordance with a development, at least some of the components are connected to each other via connecting elements, in particular rivets or bolts, wherein during production of the powder, the connecting elements are processed together with the plurality of components.

In particular, the connecting elements processed together with the plurality of components may be formed with a material different from an aluminum alloy and may, for instance, comprise titanium or a titanium alloy. Preferably, if the connecting elements are made with a metal material different from an Al alloy and are processed together with the plurality of components, producing the powder includes melting the material of the plurality of components, including the connecting elements, and atomizing the melt. Material of the connecting elements can in this development be tolerated within the resulting "cross-over" alloy, and may even be useful for improving the processability of the powder in the additive manufacturing process. In this manner, removing the connecting elements can be avoided. In some implementations, the presence of the connecting elements may even be utilized in expedient manner and in some cases, the addition of additive(s) via nano-decoration may be reduced or dispensed with, while in other implementations nano-decoration may be performed.

In accordance with a further improvement, the method further includes selecting, based on documentation available of the structure to be recycled, preferably using a component selection algorithm capable of being executed by a data processing device, components of the structure or sections thereof to be used for the production of a batch of powder of a pre-defined type, in particular having a pre-defined target powder composition. In this manner, the structure can be even more efficiently and economically recycled. For instance, the structure may be divided into portions, using the algorithm, in an optimized manner to produce batches of powder of pre-determined composition, preferably with little or no loss of metal material.

In a development, the method further includes producing a new component, in particular a structural component, for an aircraft or spacecraft, wherein the production of the new component includes additive manufacturing using the additive manufacturing process, for example laser powder bed fusion, and the powder is used as a starting material in the additive manufacturing for producing the new component. In this way, a high-grade new component may be produced from the recycled materials.

In a further improvement, the new component is heat treated after completion of the additive manufacturing process. In particular, a heat treatment adapted to the composition of the powder used in the additive manufacturing process may be selected or defined based on the selection of components of the structure to be used for the production of the powder. In this manner, desired properties, in particular mechanical properties, of the new component can be adjusted.

Furthermore, in a further development, the new component may be machined at least partially after the additive manufacturing. Thereby, the geometrical precision may be adjusted and improved at least in regions of the new component, e.g. at interfaces.

The improvements, enhancements and developments of the present invention may be arbitrarily combined with each other whenever this makes sense. Moreover, other possible enhancements, developments and implementations of the present invention comprise combinations of features of the invention which have been described above or will be described in the following in relation to the detailed description of embodiments, even where such a combination has not been expressly mentioned.

BRIEF DESCRIPTION OF THE DRAWINGS

The invention will be explained in the following with reference to the schematic figures of the drawings which illustrate embodiments of the invention. Herein.

The enclosed drawings are intended to illustrate embodiments of the invention so that the invention may be further understood. The drawings, in conjunction with the description, are intended to explain principles and concepts of the invention. Other embodiments and many of the advantages described may be inferred from the drawings. Elements of the drawings are not necessarily drawn to scale.

Elements, features and components which are identical or which have the same function or effect have been labeled in the drawings using the same reference signs, except where explicitly stated otherwise.

DETAILED DESCRIPTION OF PREFERRED EMBODIMENTS

Figure 1:
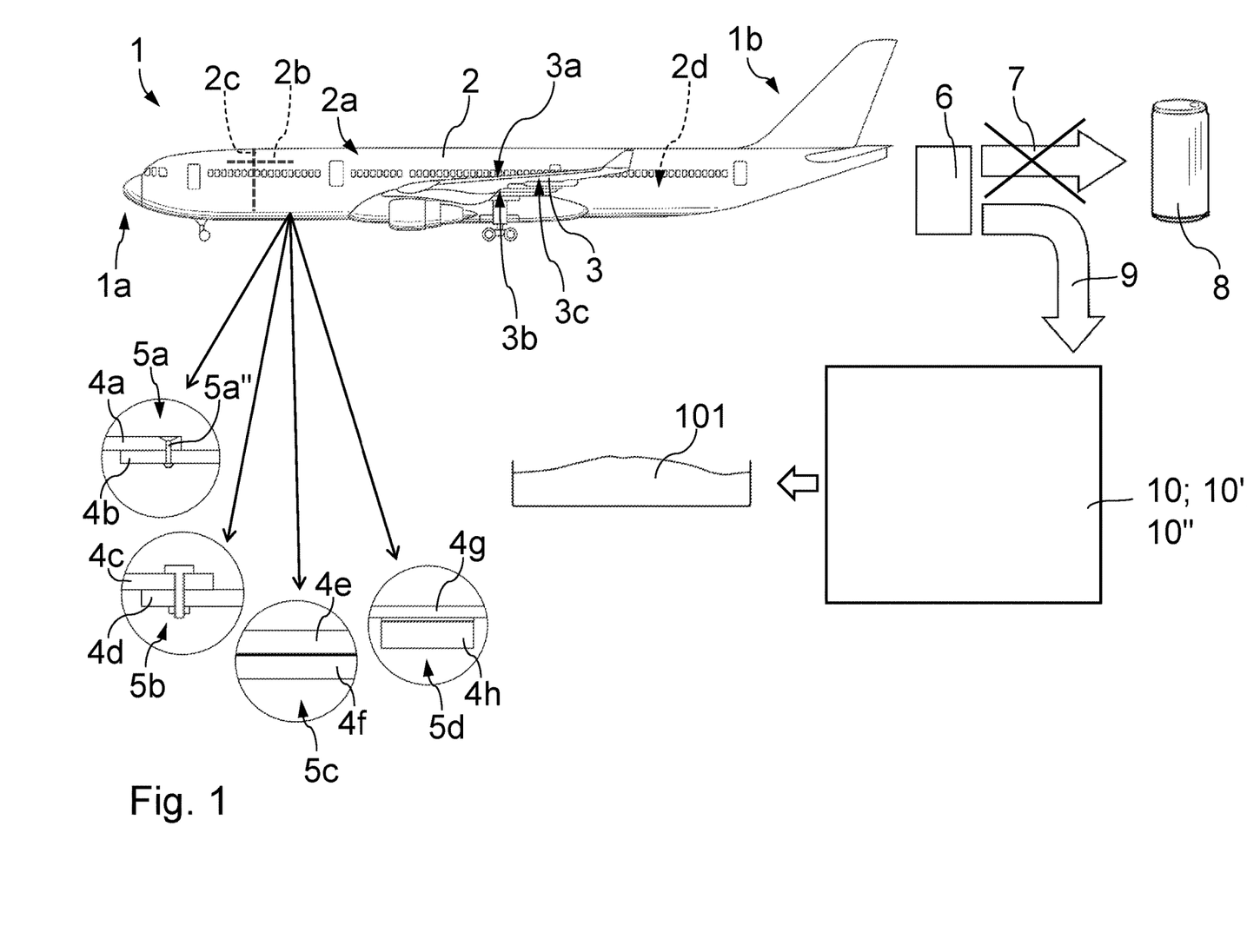
FIG. 1 displays a schematic diagram illustrating a method according to a first embodiment of the invention.

FIG. 1 shows an aircraft 1, e.g. a passenger airplane, comprising in a manner known per se a fuselage 2, wings 3, a nose 1a and an empennage 1b. The aircraft 1 in FIG. 1 comprises a primary structure, or airframe, all or a part of which is made from aluminum materials.

More specifically, the aircraft structure comprises a multitude of structural components, some of which are schematically shown in exemplary manner in FIG. 1 and designated by reference signs 2a-2d, 3a-3c, and 4a-4h. During production of the aircraft 1, the structural components have been assembled to each other so as form the aircraft structure. Accordingly, in the aircraft structure, various of the components are permanently connected to each other for example using rivets, bolted connections, welding or adhesive bonding, or a combination thereof. In exemplary manner, FIG. 1 displays a schematic riveted connection 5a of structural components 4a and 4b by a rivet 5a", a schematic bolted connection 5b of structural components 4c and 4d, a schematic welded connection 5c of structural components 4e and 4f, and a schematic connection 5d of components 4g and 4h adhesively bonded by an adhesive layer therebetween.

The structural components 4a-4h may each correspond, for example, to one of a fuselage skin 2a or pressure cabin skin, a fuselage stringer 2b, a fuselage frame 2c, an internal structural component 2d (not shown in detail in the FIGS.) of the fuselage 2, an upper wing cover 3a, a lower wing cover 3c, or a wing stringer such as a lower wing stringer 3b. Any of the structural components 4a-4h may alternatively correspond to another metal component or element of the aircraft structure not shown in more detail in FIG. 1, such as, for instance, a bracket or fastening element, a coupling piece, a clip, a cleat, or a window or door frame.

During production of the aircraft 1, each of the structural components 4a-4h, 2a-2d, 3a-3c was manufactured from a light metal alloy, more specifically an aluminum alloy. As the requirements for various structural components differ, e.g. regarding the required mechanical load-bearing capacity, capability of being cold or hot formed or being machined, resistance to fatigue or corrosion, etc., the components 4a-4h, 2a-2d, 3a-3c are made from different aerospace aluminum alloys, in particular from alloys classified in one of the 2xxx, 5xxx, 6xxx and 7xxx aluminum alloy series, wherein the alloys may for example be alloys commonly used in structural aircraft parts. More specifically, the alloys from the 2xxx series may be AlCuMg(Li) alloys, the alloys from the 5xxx series AlMg(Sc) or AlMg(Mn) alloys, the alloys from the 6xxx series AlMgSiCu alloys, the alloys from the 7xxx series AlZnMgCu alloys.

Within the aircraft or spacecraft 1, components may be present which are not made from aluminum alloys, but from other metals, or from non-metallic materials. The method as illustrated by the embodiment of FIG. 1 is directed to recycling the metallic portions or fraction of the structure, and in particular those portions made from aluminum alloy (s). One or more of the components, e.g. out of 4a-4h, 2a-2d, 3a-3c, that might be made from another metal, e.g. steel, or from, for example, a carbon-, polymer- or glass-fibre-reinforced organic composite, may preferably be removed before proceeding to recycling as described below.

Accordingly, the methods according to the embodiments described herein are applicable to structures, in particular in the air or space industry, which are formed wholly or in part with components made from aluminum alloys. The aluminum alloy components may in particular form a significant or predominant fraction of the structure.

In the airplane 1 displayed in FIG. 1, as an example, the fuselage skin 2a and fuselage stringers 2b may be made from Al alloys 2024, 2524, 7075 or 7349, the upper wing covers 3a may be made from Al alloys 7150, 7055 or 7255, the lower wing covers 3c may be made from Al alloys 2024, 2324 or 2624, the lower wing stringers 3b may be made from Al alloys 2024 or 6110, and the internal fuselage structural components 2d may be made from Al alloys 7050 or 7075.

The aircraft 1 of FIG. 1 has reached the end of its useful lifespan, leading to end-of-life "waste" 6, i.e. the material of the worn, end-of-life structure. Using the method in accordance with the embodiment of FIG. 1, down-cycling 7 of the material of the structure of the aircraft 1 to produce lower-grade products 8 can be avoided and the structure can be recycled, indicated by reference numeral 9, to make new high-quality products from the material of the structure. This significantly contributes to a sustainable use of material and reduces cost as a part of the so-called circular economy.

The method of recycling the structure of the aircraft 1, or at least a part of that structure, in accordance with the embodiment of FIG. 1 comprises a step 10, 10' or 10" of producing a powder 101 from a plurality of the components 4a-4h, 2a-2d, 3a-3c. In FIG. 1, the powder 101 is shown in schematic manner within a shallow container.

The powder 101 produced is suitable for use as a starting material in an additive manufacturing process, for example a laser powder bed fusion process, to make a new component. Yet, the powder 101 could also be adapted for use in an additive thermal spraying process.

In accordance with the embodiment of FIG. 1, the powder 101 is produced from the metal material of components which include at least two components made from different aluminum alloys. The plurality of the components from which the powder 101 is produced hence in particular comprises components or sections thereof from at least two different aluminum alloys, for example from alloys from at least two different aluminum alloy series out of the 2xxx, 5xxx, 6xxx and 7xxx series.

FIGS. 2-6 schematically illustrate recycling methods according to further embodiments. The explanations given above with reference to FIG. 1 also apply to the second to fifth embodiment.

Figure 2:
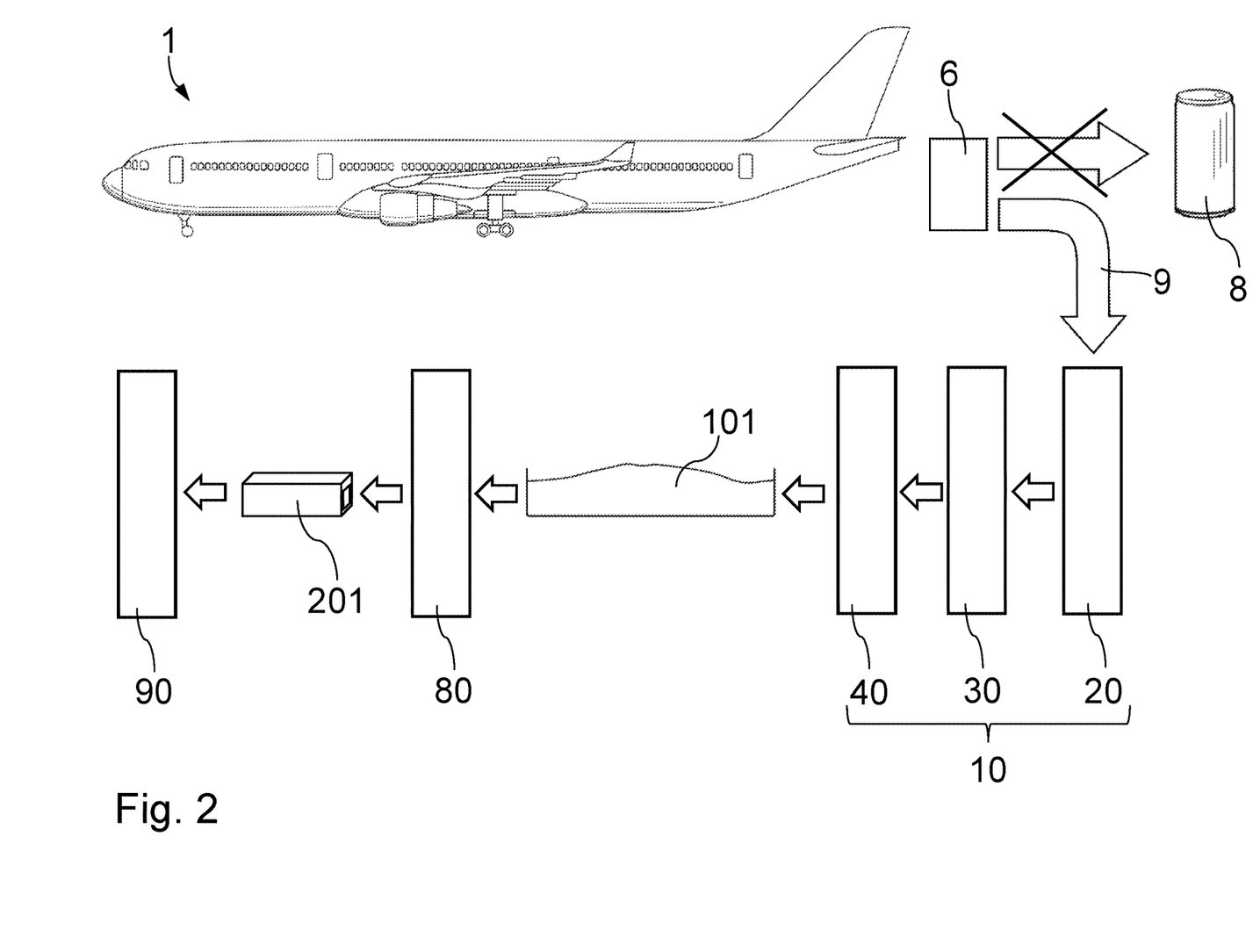
FIG. 2 shows a schematic diagram illustrating a method according to a second embodiment of the invention.

FIG. 2 illustrates a method of a second embodiment. The method of FIG. 2 comprises production 10 of a powder 101. In the second embodiment, producing the powder 101 comprises a step 20 of mechanically reducing the material of a plurality out of the components 2a-2d, 3a-3c, 4a-4h to powder by cutting, chopping, shredding and/or chipping the plurality of components to obtain small fragments, flakes or chips, and then by grinding to further reduce the particle size, in order to obtain a metal powder, with a particle size of <100 µm. The chosen components of the plurality thereof, out of the components 2a-2d, 3a-3c, 4a-4h of the structure of the aircraft 1, may each undergo cutting, chopping, shredding or chipping as a whole or, instead, only a part of one or more of these components may enter the step 20 of mechanical reduction to powder. For instance, from the entire aluminum structure of the aircraft 1, relatively large portions may be separated by cutting, wherein such a portion may contain a plurality of entire components 2a-2d, 3a-3c, 4a-4h as well as sections of one or more of such components, severed during cutting the larger portion from the remainder of the structure. The step 20 may be designated as a step of "mechanical atomization".

In the embodiment of FIG. 2, the plurality of components undergoes the mechanical reduction step 20 without prior separation or loosening of permanent connections present between components in the aircraft structure. In this way, considerable effort for separation and sorting that would be required according to a conventional way of recycling can be avoided.

The mechanical reduction, in particular grinding, in step 20 can be facilitated by performing the step 20, or at least the grinding therein, at low temperature, in particular if the components to be processed become sufficiently brittle for proper grinding at lower temperature.

Irregular fragments, chips and flakes having edges result from the cutting, chopping or chipping and grinding in step 20. In order to improve the flowability of the powder, the powder obtained as an intermediate product in step 20 then undergoes plasma spheroidization in step 30. The powder is treated by a plasma in order to modify the particle shape and obtain a powder formed by rounded, spheroid or preferably essentially spherical particles, which exhibits good flowability.

During the plasma treatment in step 30, organic contaminations, for example from sealants or similar, may also be removed. In some cases, the plasma treatment may also be able to provide some deoxidation of the powder.

In step 40, the powder obtained as an intermediate product in step 30 undergoes nano-decoration with an additive capable of acting as a grain refiner and nucleating agent. The additive may e.g. be selected from, or may comprise at least one, of titanium (Ti), silicon (Si), a zirconium hydride, for example $ZrH_2$, a titanium diboride ($TiB_2$), a calcium hexaboride ($CaB_6$) or a lanthanum hexaboride ($LaB_6$). In variants, the use of other or further additives, e.g. higher-melting pure metals or alloys, is conceivable.

More particularly, in step 40, the intermediate powder obtained in step 30 may be nano-decorated with one or more of such additives. The additive(s) can in particular be fine powders, comprising particles considerably finer than those obtained in step 30, in particular having a particle size of <1,000 nm. For example, in step 40, the powder resulting from step 30 can be mixed with the fine powder nano-additive(s) and can be mechanically alloyed with the additive(s) using a ball mill or similar device or using an ultrasonic device, or other deposition methods may be used.

At the end of step 40, the powder 101 is obtained. The powder 101 is adapted for use as a starting material in an additive manufacturing process. Steps 20, 30, 40 form sub-steps of the powder production step 10.

In a step 80, additive manufacturing or 3D-printing of a new component 201 for an aircraft or spacecraft, e.g. a structural component 201, is carried out. More specifically, the new component 201 is manufactured in step 80 in accordance with a laser powder bed fusion method, in which the powder 101 is used as a starting material. The powder 101 is applied in layered manner on a platform and selectively melted by a laser to form a three-dimensional component, which e.g. may be of intricate shape.

Figure 3:
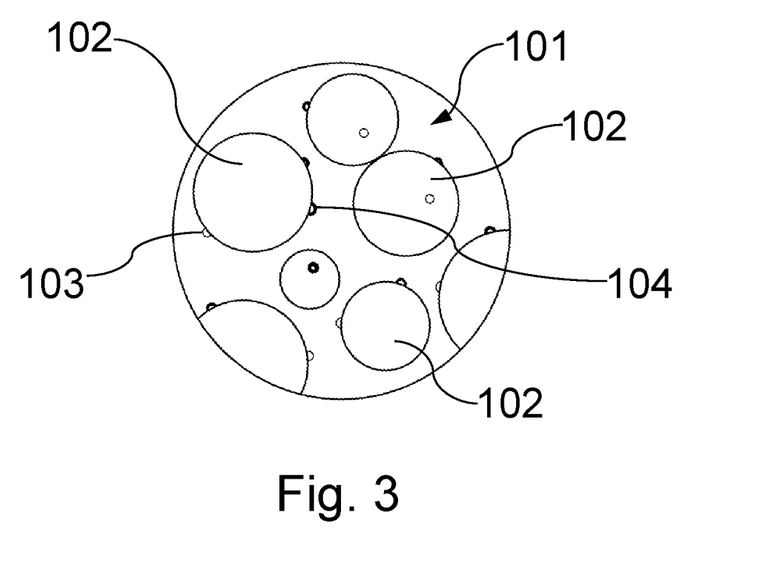
FIG. 3 schematically illustrates a detail view of a powder which may be produced in the method of the second embodiment.

In the method of the second embodiment, the powder 101 is a heterogeneous powder. The powder 101 comprises rounded, e.g. essentially spherical, particles 102, schematically displayed in FIG. 3, which at the surface thereof are decorated with nano-particles of an additive or additives as explained above. FIG. 3 shows, in exemplary manner, powder particles 102 nano-decorated with additive nano-particles 103 and 104 of two different types. Yet, nano-decoration with a single type of additive nano-particles or with more than two types of additive nano-particles is conceivable instead. In FIG. 3, the powder particles 102 are not all formed of the same metal material, but powder particles 102 of different aluminum alloys are mixed, forming the powder 101. This results from mechanically reducing components to powder that are made from different alloys without prior separation and sorting.

In step 80 of the second embodiment, a cross-over alloy of two or more aluminum alloys is formed in the local molten pool, as the powder 101 is subjected to selective melting at the laser focus. Further, in the powder bed fusion method, the local melt is able to rapidly cool. Cooling rates of at least 10,000 Kelvin per second ($10^4$ K/s), even higher than 100,000 K/s ($10^5$ K/s) or up to 1,000,000 K/s ($10^6$ K/s), are achievable. The different aluminum alloys contributed by the particles 102 preferably mix to form an essentially homogeneous melt, which also contains the additive(s) introduced by nano-decoration in step 40. As the melt rapidly cools, the alloying elements can be maintained in solid solution, avoiding phase separation.

The additive(s) introduced in step 40 act as nucleating agent(s) and grain refiner(s), so that a very fine-grained internal microstructure is obtained as the material solidifies and cools, forming a cross-over alloy. More specifically, nano-particles formed from the additive(s) selected in exemplary manner from Ti, Si, $ZrH_2$, $TiB_2$, $CaB_6$ or $LaB_6$ are high temperature stable and will not be immediately diluted in the cross-over aluminum alloy melt. In the additive manufacturing process 80, the melt locally exists only for a brief time, and rapidly solidifies, and the additive(s) can act as so-called heterogeneous nuclei.

Consequently, hot cracking can be avoided safeguarding generated cross-over alloy integrity and quality, in particular as an important basic element of the additively generated new product.

Upon completion of step 80, a new component 201 of a cross-over alloy has been formed. The component 201 may undergo further treatment, machining etc. in order to form a finished, high-grade part ready for use in an aircraft or spacecraft, e.g. as a structural member or for another purpose.

In particular, after 3D printing in step 80, the new component 201 may undergo a heat treatment, as illustrated in FIG. 2 by step 90. The heat treatment can be designed to initiate and/or promote precipitation of at least one desired phase from the solid solution of the material of the new component 201, in order to modify and improve the properties of the new component 201. The heat treatment can in some implementations be combined or overlaid with an application of external pressure, particularly gas pressure, to improve the density of the body that has been additively generated in layer-wise manner from the cross-over alloy(s). An established designation of such a process of combined application of heat and gas pressure per se is "hot isostatic pressing" (HIP).

Figure 4:
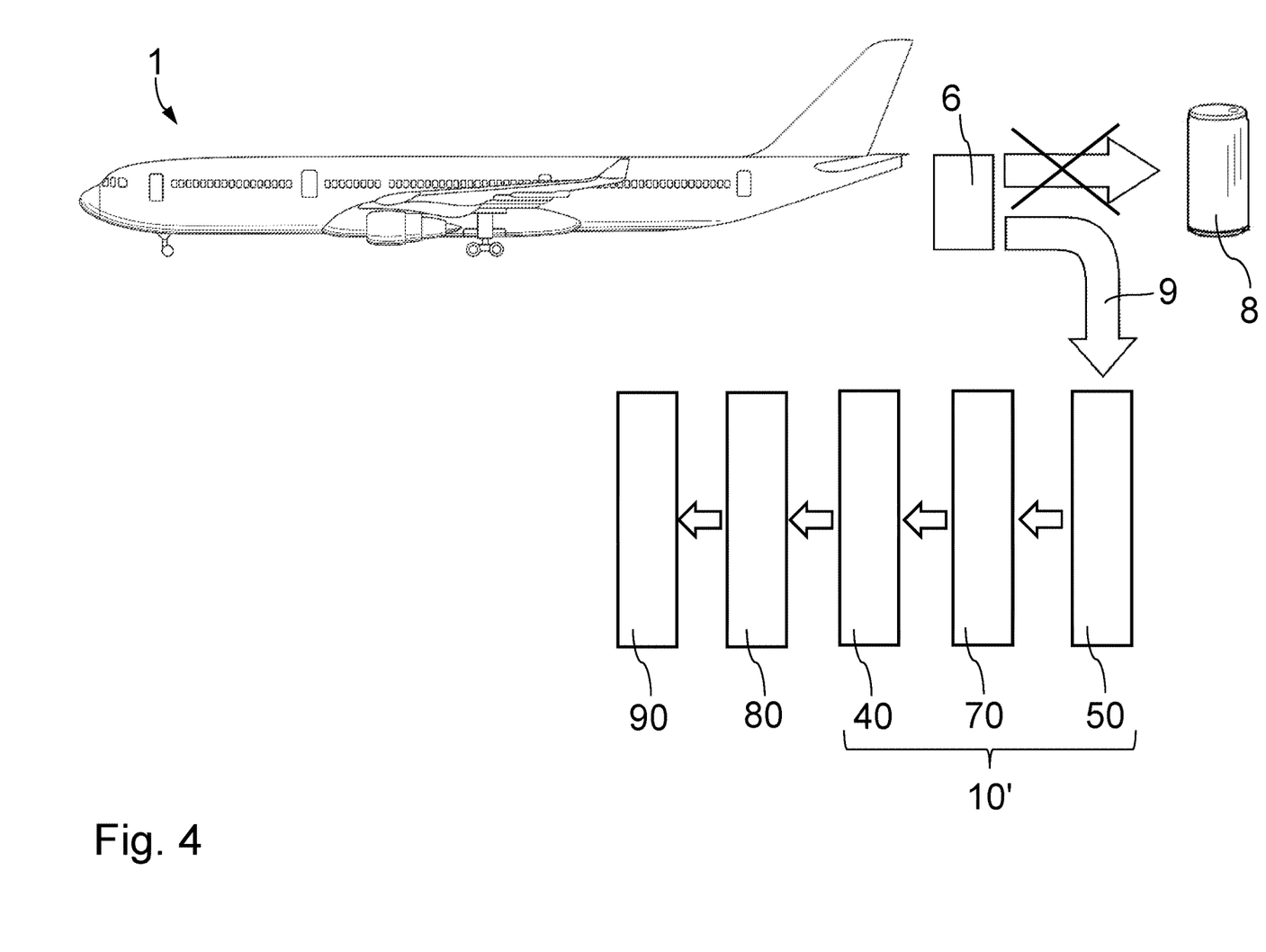
FIG. 4 shows a schematic diagram illustrating a method according to a third embodiment of the invention.

FIG. 4 illustrates a method in accordance with a third embodiment. The plurality of components, out of the components 2a-2d, 3a-3c, 4a-4h, which are still joined to each other and wherein some components may for example be present in part as sections thereof only, as a result of cutting the structure into portions, undergo melting in step 50, which is a sub-step of a powder production step 10'. If desired, the plurality of components or the parts thereof to be processed to form a powder can in a variant be mechanically reduced to smaller pieces, e.g. shredded or cut into pieces, prior to melting. Preferably, the duration of the melting step 50 is chosen sufficiently long, in such a way that a homogeneous melt is formed, with all pieces that enter the melting step 50 being molten and their materials being uniformly mixed in the melt.

The production 10' of a powder 101 that can be used at a later stage in additive manufacturing further comprises, according to the third embodiment, a step 70 in which the melt, which preferably is homogeneous, is atomized in order to obtain a powder. The melt atomization 70 may be performed either by gas atomization, e.g. using an inert gas to atomize the melt, or by centrifugal atomization, which includes jetting the melt onto a rotating element, e.g. a rotating disk. After cooling of the droplets obtained by atomization, a homogeneous powder is obtained.

As in the method of FIG. 4, the particles of the powder obtained by atomization in step 70 already have a rounded shape, which may be substantially spherical or spheroid, and therefore the powder already exhibits good flowability, a plasma spheroidization may be dispensed with in the third embodiment.

After the melt atomization step 70, the resulting powder is nano-decorated in a subsequent step 40, in the same manner as described above with reference to FIGS. 2 and 3. Additives used for nano-decoration in FIG. 4 may be selected as described above with respect to step 40 of FIG. 2, preferably in the form of nano-sized powder. Also in the case of FIG. 4, additive particles such as 103, 104 are disposed on the surface of powder particles 102 which, in the case of FIG. 4, result from melt atomization.

The powder can then be used, in a manner analogous to the powder 101 of FIGS. 1-3, as a starting material in additive manufacturing 80, more specifically in accordance with a laser powder bed fusion method or, alternatively, a thermal spraying method. A new component additively manufactured in step 80 can be heat-treated in step 90.

In some implementations, additive manufacturing 80 using the homogeneous powder directly obtained from step 70 may already result in a fine-grained structure after solidification, and hence, in such cases step 40 might be omitted. Preferably, however, a nano-decoration step 40 is provided.

The recycling method of the third embodiment may be advantageous in particular if some or all of the components to be processed, out of the components 2a-2d, 3a-3c, 4a-4h of the structure of the aircraft 1 have high ductility even at low temperatures, and therefore cannot be mechanically ground or are difficult to be reduced to particles in mechanical manner, even at low temperature.

The particles of the powder obtained in step 70 each are formed of a cross-over alloy dependent on the composition of the components that underwent melting in step 50. As a result of the cooling rate during atomization, some phase separation may occur in some implementations within the particles of the powder resulting from step 70. Yet, the powder is then used, in step 80, e.g. in a laser powder bed fusion process, in which again a melt is formed which rapidly cools to retain the alloying elements in solid solution as described above. The additive(s) added via nano-decoration in step 40 help(s) to obtain a fine-grained microstructure of the material during additive manufacturing in step 80 and to avoid hot cracking. Precipitation of one or more desired phase(s) can be initiated or promoted by a targeted heat treatment in step 90, in a manner analogous to what has been described above with reference to FIG. 2.

As may be seen from the description above, the composition of the cross-over alloy, which might also be termed a "secondary alloy" or even "dirty alloy", as it is produced from a mixture of components having different compositions, depends on the selection of the plurality of components, out of the multitude of components, e.g. 2a-2d, 3a-3c, 4a-4h, from which the structure of the aircraft 1 is formed, which are processed to form the powder 101 to be used as starting material in additive manufacturing.

Figure 5:
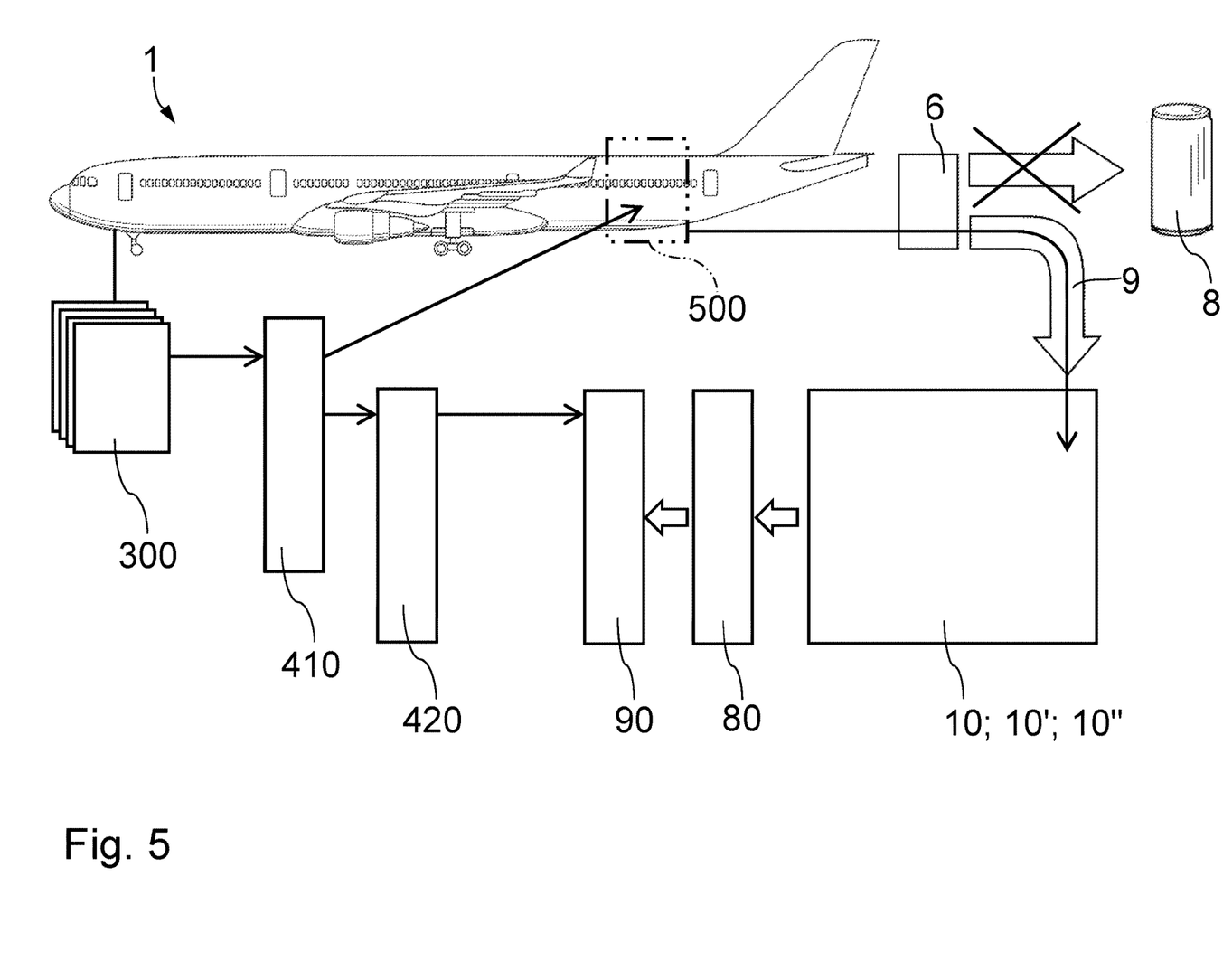
FIG. 5 displays a schematic diagram illustrating a method according to a fourth embodiment of the invention.

FIG. 5 displays a schematic diagram of a method of a fourth embodiment, in which documentation 300 available for the aircraft 1 is used for selecting the components to be processed. In particular, the documentation may contain data indicating the components forming the structure, the material from which each of the components is formed—in particular the type of aluminum alloy—and the positions of the components in the structure, and may also contain data about the type and number of connecting elements, e.g. rivets, if present.

Preparation of recycling of the structure of the aircraft 1 or a portion thereof includes, in accordance with the fourth embodiment, a step 410 of selecting components of the structure, or sections of such components, which should be used for the production of a batch of powder of pre-defined, desired type, having a target overall powder composition. For instance, step 410 may result in the definition of a portion 500 to be cut from the structure of the aircraft 1, or several such portions, which is or are to be processed to form a batch of powder. A component selection algorithm, capable of being executed by a data processing device such as a computer, may be used to implement step 410. The component selection algorithm may, in a variant, be additionally configured to partition the entire aircraft structure into portions 500 from which batches of powder of pre-defined composition, which may vary or be identical, can be made.

Furthermore, the method of the fourth embodiment illustrated in FIG. 5 also includes a step 420 of selecting or defining a heat treatment for treating, in step 90, the new component additively made in step 80. In step 420, the heat treatment to be performed in step 90 is specifically adapted to the composition of the new component, expected from the selection of components of the structure, or from the selection of the portion 500, to be used in the production of the powder 101 that forms the starting material for the additive manufacturing process in step 80.

Figure 6:
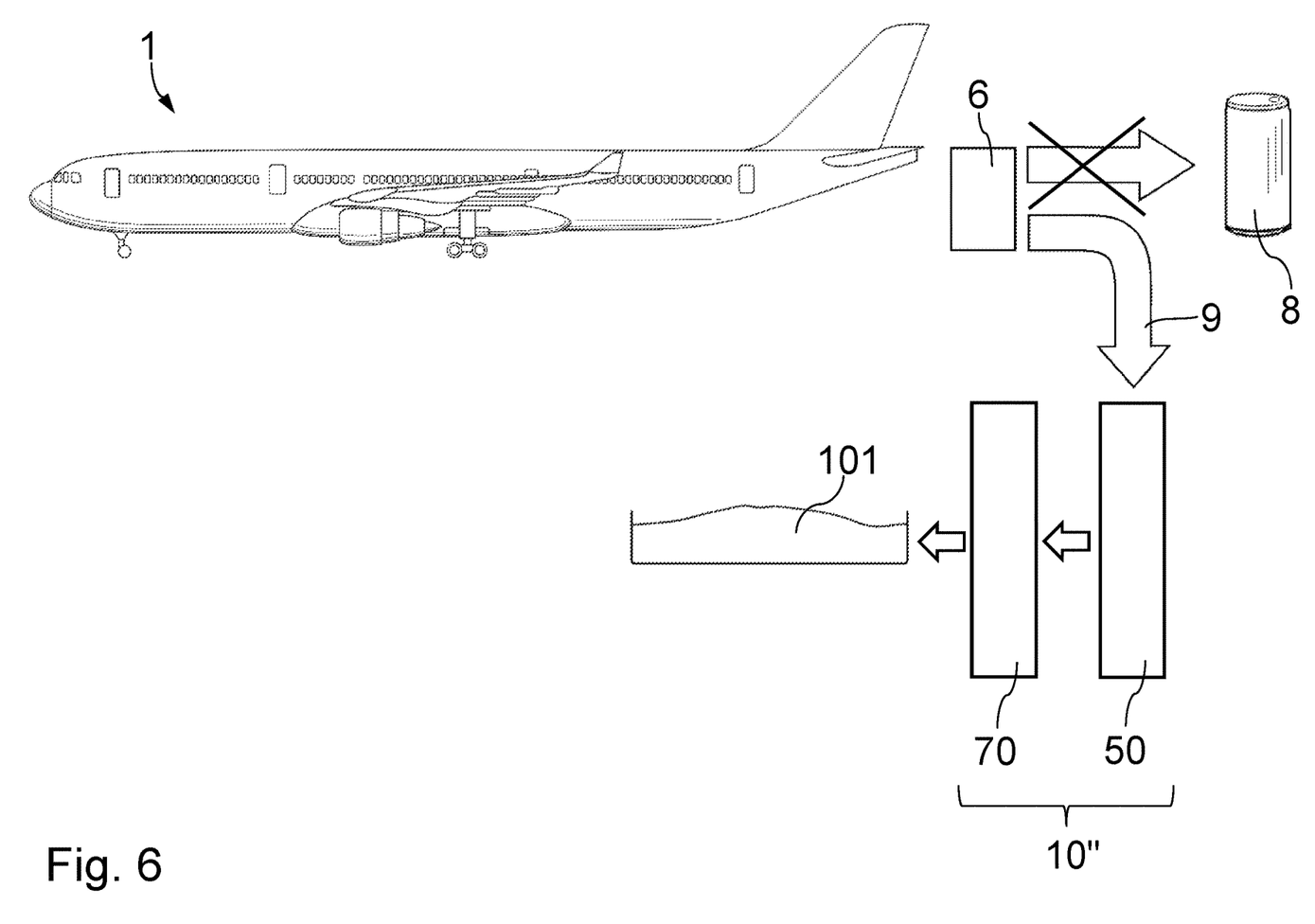
FIG. 6 displays a schematic diagram illustrating a method according to a fifth embodiment of the invention.

A method according to a fifth embodiment is schematically shown in FIG. 6, which is a variant of the method of FIG. 4 and comprises a modified step 10" of producing a powder 101 adapted for being used in an additive manufacturing process. In the structure of the aircraft 1 as illustrated in FIG. 6, some of the components from which the powder 101 is produced are connected to each other using connecting elements formed as rivets or bolts made from titanium or a titanium alloy, or alternatively even from high-strength steel. The components are not separated from each other, but enter the melting step 50 in connected condition, along with the rivets. In the melt, metal material of the rivets, in particular Ti, for example contained in a Ti alloy, may be helpful as an additive capable of improving the processability of the powder, obtained after atomization 70, in additive manufacturing 80. In particular, Ti may help to obtain a fine-grained structure and avoid hot cracking. FIG. 6 shows that in this variant, a further nano-decoration step may in some embodiments be dispensed with. In other variants, a nano-decoration step 40 may be provided to add further nano-sized additive(s) after melt atomization 70, in order to further promote obtaining a fine-grained structure in a subsequent additive manufacturing step 80, in particular if the material of the connecting elements formed from a metal other than an Al alloy may be tolerated in the "cross-over" alloy but is not itself capable of promoting a microstructure as desired during solidification.

In an analogous variant of the method of FIG. 2, rivets made from titanium or a titanium alloy, or even elements made from high-strength steel, may be mechanically reduced to small pieces and ground along with the components 2a-2d, 3a-3c, 4a-4h. In this case, it is preferable to separate the powder resulting from the mechanical reduction to pieces, based on the different densities of the material of different particles, in order to obtain two or more powder fractions, i.e. an Al-alloy fraction, a Ti fraction and/or a steel fraction. The Al-alloy powder fraction may then be processed further to obtain the powder 101 as described above by plasma-spheroidization 30 and nano-decoration 40. In a variant, it is conceivable to prevent connecting elements from e.g. Ti, Ti alloy and/or steel from entering step 20.

Depending on the structure to be recycled, portions thereof may not contain such additional elements e.g. from Ti or a Ti alloy or from steel, or may not contain them in significant amount, so that in this case, a mixture essentially containing different aluminum alloys is subjected to a powder production process including mechanical reduction to powder and plasma treatment or melting and melt atomization, as described above.

With respect to the embodiments described above, it is conceivable that the new component, e.g. 201, may be subjected at least partially to machining if necessary or desired, e.g. at interface portions thereof.

Also, it is conceivable in variants of the embodiments above, if required in order to adjust the composition of the powder, that (an) additional alloying element(s) may be added during production of the powder. Preferably, however, such additional alloying element(s) would be added in small quantities only, so as to rely to a very large extent on the materials to be recycled.

The embodiments described above in particular provide advantages of:
- avoiding expensive separation and sorting, in particular Al-alloy composition respecting sorting, of components to be recycled;
- enabling cost effective and energy effective tailor-made powder production;
- exploiting the full potential of additive manufacturing by processing powders and material combinations not accessible by conventional processing routes;
- providing access to high-quality aluminum products obtained by cost-effective and efficient recycling of e.g. aircraft structures, and avoiding down-cycling or mere storage of end-of-life structures;

Although the invention has been completely described above with reference to preferred embodiments, the invention is not limited to these embodiments but may be modified in many ways.

For instance, the structure to be recycled is not necessarily an aircraft structure, but could instead be a spacecraft structure, or another structure, for instance formed with light metal components.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1 aircraft
1a nose
1b empennage
2 fuselage
2a fuselage skin
2b fuselage stringer
2c fuselage frame
2d internal fuselage structures
3 wing
3a upper wing covers
3b lower wing stringers
3c lower wing covers
4a-4h component
5a riveted connection
5b bolted connection
5c welded connection
5d adhesively bonded connection
6 end-of-life "waste"
7 down-cycling
8 product resulting from down-cycling
9 recycling
10 powder production
10' powder production
10" powder production
20 mechanical reduction to powder step
30 plasma-spheroidization step
40 nano-decoration step
50 melting step
70 melt atomization step
80 additive manufacturing
90 heat treatment
101 powder
102 powder particle
103 nano-particle of additive
104 nano-particle of additive
201 additively manufactured new component
300 documentation
410 component selection step
420 heat treatment selection or definition step
500 selected portion of structure

The invention claimed is:

1. A method of recycling a structure, or at least a portion thereof, wherein the structure comprises components connected to each other and each made from a metal alloy, wherein the method comprises:
   producing, at least from material of a plurality of components including components made from at least two different metal alloys, a powder configured to be utilized as a starting material in an additive manufacturing process, wherein producing the powder comprises:
      melting the material of the plurality of components to form a homogeneous melt;
      melt atomizing the homogenous melt in order to obtain the powder; and
      nano-decorating the powder with at least one additive.

2. The method according to claim 1, wherein the melt is formed by:
   subjecting at least some of the components from the plurality of the components, or sections thereof, which are still connected to each other to melting, or
   mechanically reducing at least some of the components from the plurality of the components, or sections thereof, which are still connected to each other to smaller pieces and subjecting the smaller pieces to melting.

3. The method according to claim 1, wherein the producing comprises:
   mechanically reducing the material of the plurality of components to powder, by cutting, or chopping, or shredding, or chipping, or grinding, or a combination thereof.

4. The method according to claim 3, wherein the mechanically reducing the material to powder comprises subjecting at least some of the components from the plurality of the components, or sections thereof, which are still connected to each other to cutting, or chopping, or shredding, or chipping, or grinding, or a combination thereof.

5. The method according to claim 1, wherein producing the powder further comprises subjecting the powder to a plasma treatment.

6. The method according to claim 1, wherein the at least one additive is selected from consisting of: titanium, silicon, a zirconium hydride, a titanium diboride, a calcium hexaboride, a lanthanum hexaboride, and mixtures thereof.

7. The method according to claim 1, wherein the additive manufacturing process is a powder bed process.

8. The method according to claim 1, wherein the components from the plurality of components includes components each made from an aluminum alloy.

9. The method according to claim 1, wherein the components from the plurality of components includes components made from alloys classified in at least two different alloy series, and
   the method further comprising:
      producing a new component with the additive manufacturing process, wherein the new component comprises a cross-over alloy can be additively made.

10. The method according to claim 1, wherein the components from the plurality of components comprises one or more of at least a portion of an outer fuselage skin, a wing cover, a fuselage stringer, a wing stringer, a fuselage frame, an internal structural element of a fuselage, a bracket or a fastening element.

11. The method according to claim 1, wherein the components from the plurality of components comprises components connected to each other using rivets or using a bolted connection or welded to each other or adhesively bonded to each other.

12. The method according to claim 1, wherein at least some of the components from the plurality of components are connected to each other via connecting elements, in particular rivets or bolts, the connecting elements being formed with a material different from an aluminum alloy, wherein during production of the powder, the connecting elements are processed together with the components from the plurality of components.

13. The method according to claim 1, wherein the method further comprises:
selecting, based on documentation available of the structure to be recycled, components of the structure or sections thereof to be used for the production of a batch of a pre-defined powder.

14. The method according to claim 1, wherein the method further comprises:
producing a new component for an aircraft or spacecraft, wherein the producing of the new component includes the additive manufacturing process and the powder is used as the starting material in the additive manufacturing process for producing the new component.

15. The method according to claim 1, wherein the component is an aircraft or spacecraft structure.

16. The method according to claim 1, wherein the additive manufacturing process comprises locally melting the powder to form a melt and cooling the melt resulting therefrom at a cooling rate of at least 10,000 Kelvin per second.

17. The method according to claim 1, wherein the components from the plurality of components includes components each made from an aluminum alloy classified in a 2xxx aluminum alloy series, a 5xxx aluminum alloy series, a 6xxx aluminum alloy series, and a 7xxx aluminum alloy series.

18. A component for an aircraft or spacecraft made using additive manufacturing, wherein the component is produced with the powder obtained in accordance with the method of claim 1.

19. A method of recycling a structure, or at least a portion thereof, wherein the structure comprises components connected to each other and each made from an aluminum alloy, wherein the method comprises:
producing, at least from material of a plurality of components including components made from at least two different aluminum alloys, a powder configured to be utilized as a starting material in an additive manufacturing process;
wherein the additive manufacturing process comprises locally melting the powder as part of a laser powder bed fusion process to form a melt and cooling the melt resulting therefrom at a cooling rate of at least 10,000 Kelvin per second; wherein producing the powder comprises nano-decorating the powder with at least one additive which is an additive capable of acting as a grain refiner and nucleating agent, the additive being a fine powder nano-additive comprising particles having a particle size of <1000 nm.

* * * * *